(12) United States Patent
Hano

(10) Patent No.: US 10,224,843 B2
(45) Date of Patent: Mar. 5, 2019

(54) MOTOR DRIVE DEVICE AND PHASE CURRENT DETECTING METHOD FOR THREE-PHASE BRUSHLESS MOTOR

(71) Applicant: HITACHI AUTOMOTIVE SYSTEMS, LTD., Hitachinaka-shi, Ibaraki (JP)

(72) Inventor: Masaki Hano, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 106 days.

(21) Appl. No.: 15/564,838

(22) PCT Filed: Mar. 31, 2016

(86) PCT No.: PCT/JP2016/060699
§ 371 (c)(1),
(2) Date: Oct. 6, 2017

(87) PCT Pub. No.: WO2016/163301
PCT Pub. Date: Oct. 13, 2016

(65) Prior Publication Data
US 2018/0115264 A1 Apr. 26, 2018

(30) Foreign Application Priority Data
Apr. 7, 2015 (JP) .................. 2015-078782

(51) Int. Cl.
*H02P 6/10* (2006.01)
(52) U.S. Cl.
CPC ..................... *H02P 6/10* (2013.01)
(58) Field of Classification Search
CPC ...... H02P 6/10; H02P 6/28; H02P 6/15; H02P 27/08; H02P 6/181; H02P 6/08; H02M 1/4216
See application file for complete search history.

(56) References Cited

U.S. PATENT DOCUMENTS

2006/0197480 A1* 9/2006 Mori .................. H02P 6/16
318/400.04
2008/0018279 A1* 1/2008 Fukamizu .......... H02P 6/182
318/432
(Continued)

FOREIGN PATENT DOCUMENTS

JP H06-153526 A 5/1994
JP 2004-159391 A 6/2004
(Continued)

OTHER PUBLICATIONS

Japanese Office Action issued in corresponding application No. 2015-078782 dated Nov. 7, 2017 with partial English translation.

*Primary Examiner* — Thai Dinh
(74) *Attorney, Agent, or Firm* — Foley & Lardner LLP

(57) ABSTRACT

The present invention relates to a motor drive device and a phase current detecting method for a three-phase brushless motor, and more particularly to a technique of detecting each phase current through A/D conversion that is carried out once per PWM carrier cycle, by use of a current sensor for detecting a DC bus current of an inverter. The control unit of the present invention calculates a phase current for one phase, an absolute phase current value of which becomes maximum at a detection timing that is set once per PWM control cycle, from an output of the current sensor, and estimates phase currents for the remaining two phases based on a peak value of a phase current detected at each detection timing, a motor angle, and a phase shift of an actual phase current waveform relative to the motor angle.

7 Claims, 13 Drawing Sheets

(56) References Cited

U.S. PATENT DOCUMENTS

2012/0194109 A1* 8/2012 Uryu .................... B62D 5/0403
  318/400.15
2014/0103844 A1* 4/2014 Omata ...................... H02P 6/10
  318/400.23

FOREIGN PATENT DOCUMENTS

JP       2004159391 A  *  6/2004
JP       2005-192335 A     7/2005

* cited by examiner

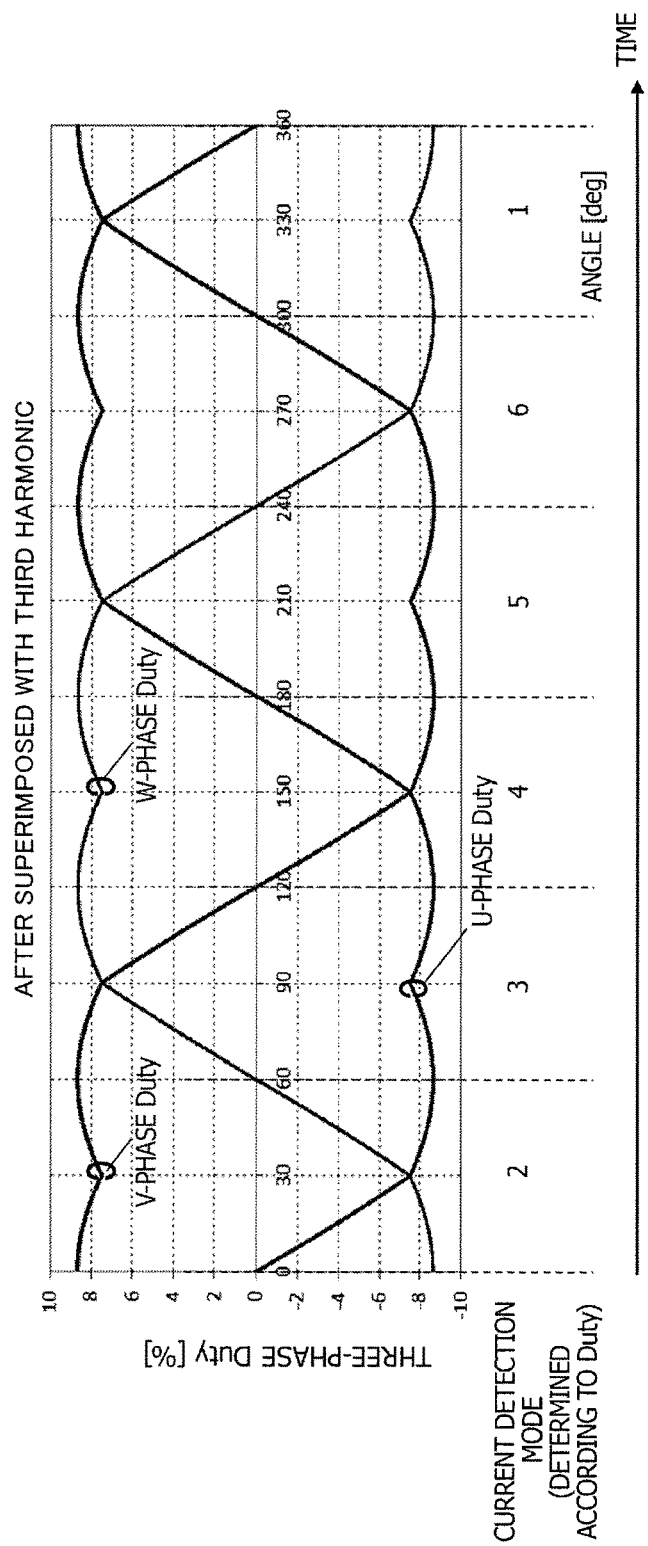

FIG.9

| CURRENT DETECTION MODE | U-PHASE CURRENT | V-PHASE CURRENT | W-PHASE CURRENT |
|---|---|---|---|
| 1 | U-PHASE CURRENT ESTIMATION VALUE | V-PHASE CURRENT ESTIMATION VALUE | -1 x 1-SHUNT CURRENT GENERATION VALUE |
| 2 | U-PHASE CURRENT ESTIMATION VALUE | 1-SHUNT CURRENT GENERATION VALUE | W-PHASE CURRENT ESTIMATION VALUE |
| 3 | -1 x 1-SHUNT CURRENT GENERATION VALUE | V-PHASE CURRENT ESTIMATION VALUE | W-PHASE CURRENT ESTIMATION VALUE |
| 4 | U-PHASE CURRENT ESTIMATION VALUE | V-PHASE CURRENT ESTIMATION VALUE | 1-SHUNT CURRENT GENERATION VALUE |
| 5 | U-PHASE CURRENT ESTIMATION VALUE | -1 x 1-SHUNT CURRENT GENERATION VALUE | W-PHASE CURRENT ESTIMATION VALUE |
| 6 | 1-SHUNT CURRENT GENERATION VALUE | V-PHASE CURRENT ESTIMATION VALUE | W-PHASE CURRENT ESTIMATION VALUE |

FIG.11

| CURRENT MODE | CURRENT MODE | V-PHASE CURRENT | | W-PHASE CURRENT | |
|---|---|---|---|---|---|
| 1⇒2 4⇒5 | 1⇒2 4⇒5 | - | | \|Iw(PREVIOUS VALUE)\| - \|Iw(PRESENT VALUE)\| < PREDETERMINED VALUE | CORRECT TO RETARD ADVANCED ANGLE |
| | | | | \|Iw(PREVIOUS VALUE)\| - \|Iw(PRESENT VALUE)\| > PREDETERMINED VALUE | CORRECT TO ADVANCE DELAYED ANGLE |
| 2⇒3 5⇒6 | 2⇒3 5⇒6 | \|Iv(PREVIOUS VALUE)\| - \|Iv(PRESENT VALUE)\| < PREDETERMINED VALUE | CORRECT TO RETARD ADVANCED ANGLE | - | |
| | | \|Iv(PREVIOUS VALUE)\| - \|Iv(PRESENT VALUE)\| > PREDETERMINED VALUE | CORRECT TO ADVANCE DELAYED ANGLE | | |
| 3⇒4 6⇒1 | 3⇒4 6⇒1 | | CORRECT TO RETARD ADVANCED ANGLE | - | |
| | | | CORRECT TO ADVANCE DELAYED ANGLE | | |

MOTOR DRIVE DEVICE AND PHASE CURRENT DETECTING METHOD FOR THREE-PHASE BRUSHLESS MOTOR

TECHNICAL FIELD

The present invention relates to a motor drive device and to a phase current detecting method for a three-phase brushless motor, and more particularly, relates to a technique of determining phase currents in a three-phase brushless motor based on a current detection value from a current sensor for detecting a DC bus current of an inverter.

BACKGROUND ART

Patent Document 1 discloses, as a current detecting method for a converter that converts a direct current to three-phase alternating currents, a method of detecting two current values of different phases by a direct current sensor and calculating a current value of the remaining phase based on the two detected current values.

REFERENCE DOCUMENT LIST

Patent Document

Patent Document 1: JP H 6-153526 A

SUMMARY OF THE INVENTION

Problems to be Solved by the Invention

In a motor drive device equipped with a current sensor for detecting a DC bus current of an inverter, two current detection periods are set within one PWM carrier cycle, and then two current values detected at these two periods are assigned to two of three phases, while a current value of the remaining phase is calculated so that a sum of three-phase currents equals zero. With this configuration, phase currents of three phases can be determined using detection values of the DC bus current.

In carrying out the above detecting method, two A/D conversions are required per PWM carrier cycle (i.e., PWM control cycle) and a microcomputer has to read output(s) from a current sensor in order to determine three-phase currents per PWM carrier cycle.

Specifically, two current detection periods are set within one PWM carrier cycle; a microcomputer executes A/D-conversion of output signals from a current sensor at each of the two current detection periods and read the converted signals; the two current detection values read at each current detection period are assigned to two phases; and a phase current of the remaining phase is estimated from the two current detection values so as to determine currents of three phases per PWM carrier cycle.

However, some low-spec (low-price) microcomputers can conduct only one A/D conversion within one PWM carrier cycle. Thus, the above phase current detecting method may possibly not be applied to a drive device configured by such a microcomputer.

Means for Solving the Problems

The present invention has been made in view of the above problems and accordingly its object is to provide a motor drive device and a phase current detecting method for a three-phase brushless motor, which can determine phase currents through A/D conversion that is carried out once per PWM carrier cycle, by use of a current sensor for detecting a DC bus current of an inverter.

In order to achieve the above object, the present invention provides a motor drive device including: an inverter configured to supply an AC power to a three-phase brushless motor; a current sensor configured to detect a DC bus current of the inverter; and a control unit configured to receive an output of the current sensor and PWM-control the inverter, the motor drive device executing sinusoidal driving of the three-phase brushless motor, wherein the control unit calculates a phase current for one phase, an absolute phase current value of which becomes maximum at a detection timing that is set once per PWM control cycle, from an output of the current sensor, and then estimates phase currents for the remaining two phases based on a peak value of a phase current detected at each detection timing, a motor angle, and a phase shift of an actual phase current waveform relative to the motor angle.

Also, the present invention provides a phase current detecting method for a three-phase brushless motor, which is to determine a phase current of each phase in the three-phase brushless motor that is sinusoidal-driven by PWM-controlling an inverter, based on an output of a current sensor for detecting a DC bus current of the inverter, the method including the steps of: setting one detection timing for detecting a phase current for one phase, an absolute phase current value of which becomes maximum, per PWM control cycle; setting a phase current detection value based on an output of the current sensor at the detection timing; determining a peak value of the phase current detection value; detecting a motor angle; setting a phase shift of an actual phase current waveform relative to the motor angle; calculating a phase current estimation value based on the peak value, the motor angle, and the phase shift; and assigning the phase current detection value as a phase current value for one phase, and assigning phase current estimation values to the remaining two phases.

Effects of the Invention

According to the present invention, phase currents of three phases can be determined by obtaining a current detection value at a detection timing that is set once per PWM control cycle. Thus, the motor drive device and the phase current detecting method for a three-phase brushless motor according to the present invention are applicable to a microcomputer that allows only one A/D conversion per PWM carrier cycle.

BRIEF DESCRIPTION OF THE DRAWINGS

FIG. 8 is a timing chart illustrating a correlation between control duty of each phase and a current detection mode according to the embodiment of the present invention.

FIG. 9 illustrates phase currents that are assigned to each phase in each current detection mode according to the embodiment of the present invention.

FIG. 11 illustrates phase correction that is performed based on a current deviation according to the embodiment of the present invention.

MODE FOR CARRYING OUT THE INVENTION

Embodiments of the present invention will be described below.

In the following description, a motor drive device and a phase current detecting method for a three-phase brushless motor according to the present invention are applied, by way of example, to driving of a three-phase brushless motor constituting a hydraulic mechanism for a vehicular automatic transmission.

Figure 1:
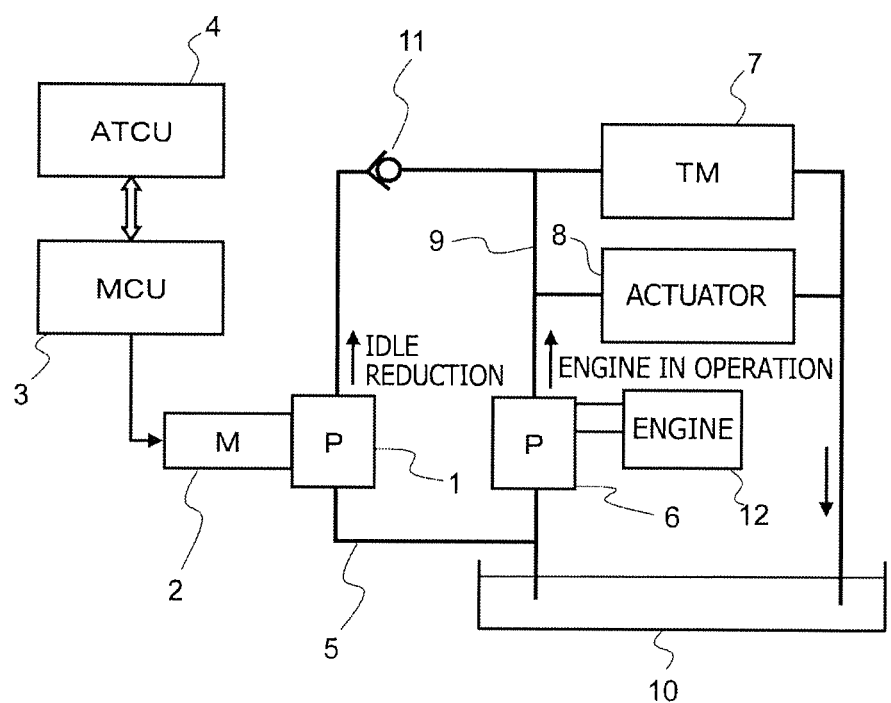
FIG. 1 is a block diagram illustrating a hydraulic mechanism of a vehicular automatic transmission according to an embodiment of the present invention.

A hydraulic mechanism of FIG. 1 includes as an oil pump that supplies oil to a transmission mechanism 7 and an actuator 8, a main oil pump 6 driven with an output of an internal combustion engine 12 as a power source of a vehicle, and an electric sub-oil pump 1.

Sub-oil pump 1 is driven to, for example, supply oil in place of main oil pump 6 when internal combustion engine 12 stops temporarily due to idle reduction control, etc. and in turn, main oil pump 6 stops, or to auxiliarily supply oil when main oil pump 6 is being driven.

Sub-oil pump 1 is driven by a three-phase brushless motor (interior permanent magnet three-phase synchronous motor (IPMSM)) 2. Three-phase brushless motor 2 is controlled by a motor drive device (motor control unit (MCU)) 3.

Motor drive device 3 controls driving of three-phase brushless motor 2 based on a command from an AT control unit (ATCU) 4.

Sub-oil pump 1 driven by three-phase brushless motor 2 is to pump oil from an oil pan 10 and supply the oil to transmission mechanism 7 or actuator 8 through an oil pipe 5. Main oil pump 6 driven by internal combustion engine 12 is to pump oil from oil pan 10 and supply the oil to transmission mechanism 7 or actuator 8 through an oil pipe 9.

The oil supplied to transmission mechanism 7 or actuator 8 flows back to oil pan 10 and is again pumped by sub-oil pump 1 and/or main oil pump 6, circulating in a closed circuit of oil.

A check valve 11 is disposed in oil pipe 5 downstream of sub-oil pump 1.

Note that the above hydraulic mechanism is given as an example of a vehicle system equipped with a three-phase brushless motor, and a motor drive device and a phase current detecting method for a three-phase brushless motor according to the present invention are applicable to various types of vehicular systems that adopt a three-phase brushless motor as an actuator.

A motor drive device and a phase current detecting method for a three-phase brushless motor according to the present invention can be applied, for example, to a three-phase brushless motor for driving an electric water pump used to circulate cooling water of internal combustion engine 12 in a hybrid vehicle, etc.

Figure 2:
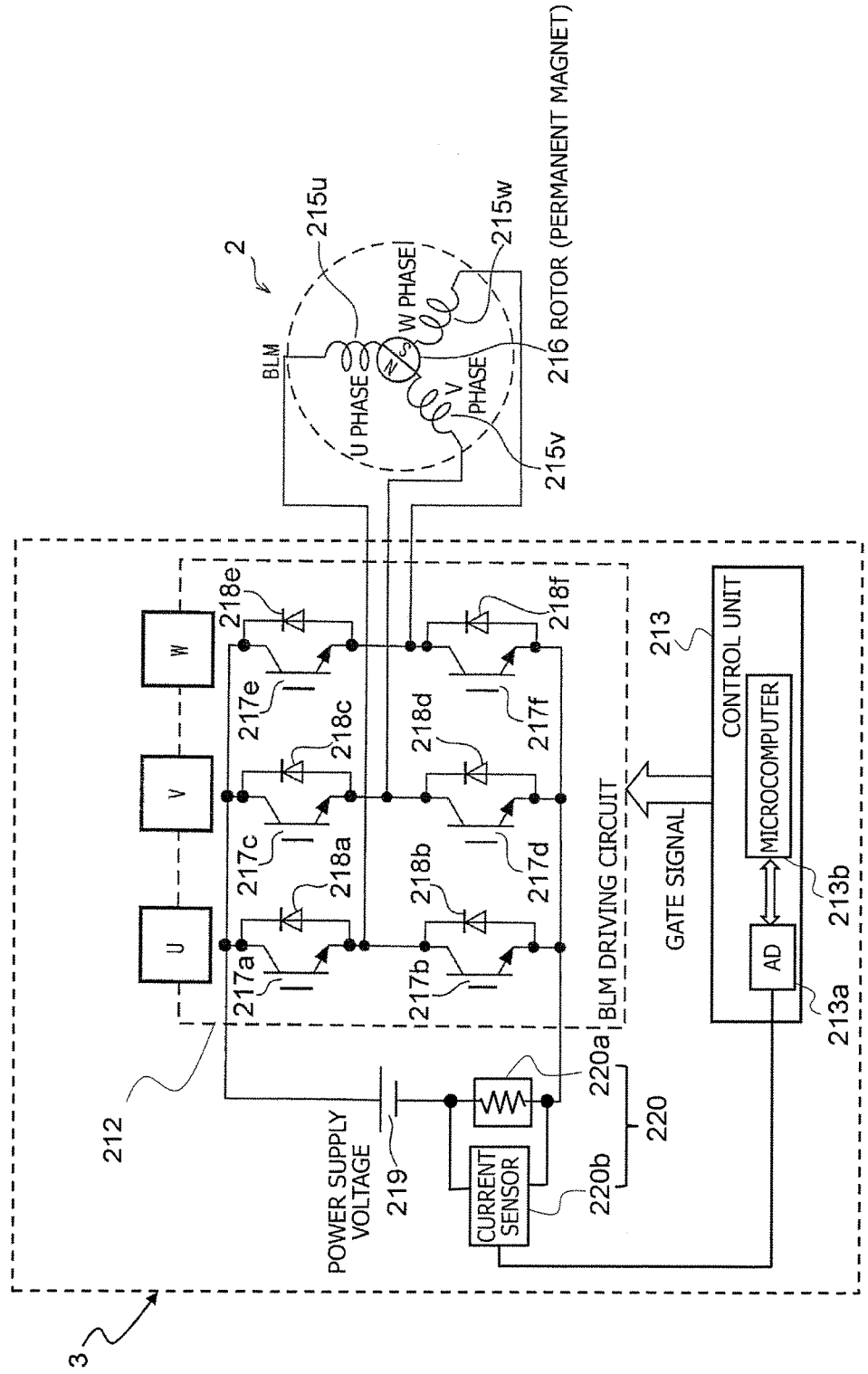
FIG. 2 is a circuit diagram illustrating a driving circuit and a three-phase brushless motor according to the embodiment of the present invention.

FIG. 2 is a circuit diagram illustrating an example of three-phase brushless motor 2 and motor drive device 3.

Motor drive device 3 for driving three-phase brushless motor 2 includes a driving circuit (inverter circuit) 212 and a control unit 213.

Control unit 213 includes an A/D converter 213a and a microcomputer 213b constituted of a microprocessor (CPU, MPU, etc.), a ROM, a RAM, etc., and communicates with AT control unit 4.

Three-phase brushless motor 2 is a three-phase DC brushless motor, which includes a cylindrical stator (not illustrated) having star-connected three-phase coils 215u, 215v, 215w of U-phase, V-phase, and W-phase, and a permanent magnet rotor (rotor) 216 rotatably provided in a space formed at the center of the stator.

Note that three-phase brushless motor 2 has no sensor for detecting a position (positional information) of the rotor and thus, control unit 213 controls driving of brushless motor 2 in a sensorless driving manner, i.e., without using any sensor for detecting a position (positional information) of the rotor.

Driving circuit 212 includes an inverter 212a having three-phase bridge-connected switching elements 217a to 217f constituted of antiparallel diodes 218a to 218f, and a DC power supply circuit 219. Inverter 212a supplies AC power to three-phase brushless motor 2.

Switching elements 217a to 217f of inverter 212a are configured, for example, by an FET and control terminals (gate terminals) of individual switching elements 217a to 217f are connected to control unit 213.

Control unit (controller) 213 executes PWM (pulse width modulation) control on inverter 212a. To be specific, control unit 213 executes on/off control on switching elements 217a to 217f through triangular wave comparison that is a kind of PWM control so as to control voltage applied to three-phase brushless motor 2.

According to the PWM control based on the triangular wave comparison, triangular wave (carrier) is compared with a PWM timer that is set according to a command duty ratio (command voltage) so as to detect a timing for turning on/off individual switching elements 217a to 217f.

Also, a current sensor 220 for detecting a DC bus current of inverter 212a is disposed between lower arms (switching elements 217b, 217d, and 217f) of the respective phases and power supply circuit 219.

Current sensor 220 is configured by a shunt resistor 220a connected in series between the lower arms of the respective phases and power supply circuit 219 and a detection circuit 220b. Detection circuit 220b detects voltage proportional to current generated through shunt resistor 220a and then outputs an analog signal corresponding to the detected voltage.

An analog voltage signal (DC bus current detection signal) from detection circuit 220b is A/D-converted by A/D converter 213a and read by microcomputer 213b.

Control unit 213 drives brushless motor 2 through sinusoidal driving, which method applies a sinusoidal voltage to each phase.

According to the sinusoidal driving method, control unit 213 derives positional information about the rotor from an induced voltage (speed-induced voltage) resulting from the rotor's rotation, while estimating a rotor position based on the motor rotational speed during the time between detection cycles for detecting the rotor position based on the speed-induced voltage. Then, control unit 213 performs vector control to determine three-phase voltage Vu, Vv, Vw based on the estimated rotor position and a command torque corresponding to a target rotational speed of sub-oil pump 1, etc. and control the direction and magnitude of current based on a phase-to-phase difference in voltage. Then, control unit 213 supplies the resultant three-phase alternating current to each phase.

Note that three-phase brushless motor 2 may be equipped with a magnetic pole position sensor so that control unit 213 detects the rotor angle (magnetic pole position) based on an output of the magnetic pole position sensor and controls driving of three-phase brushless motor 2.

Figure 3:
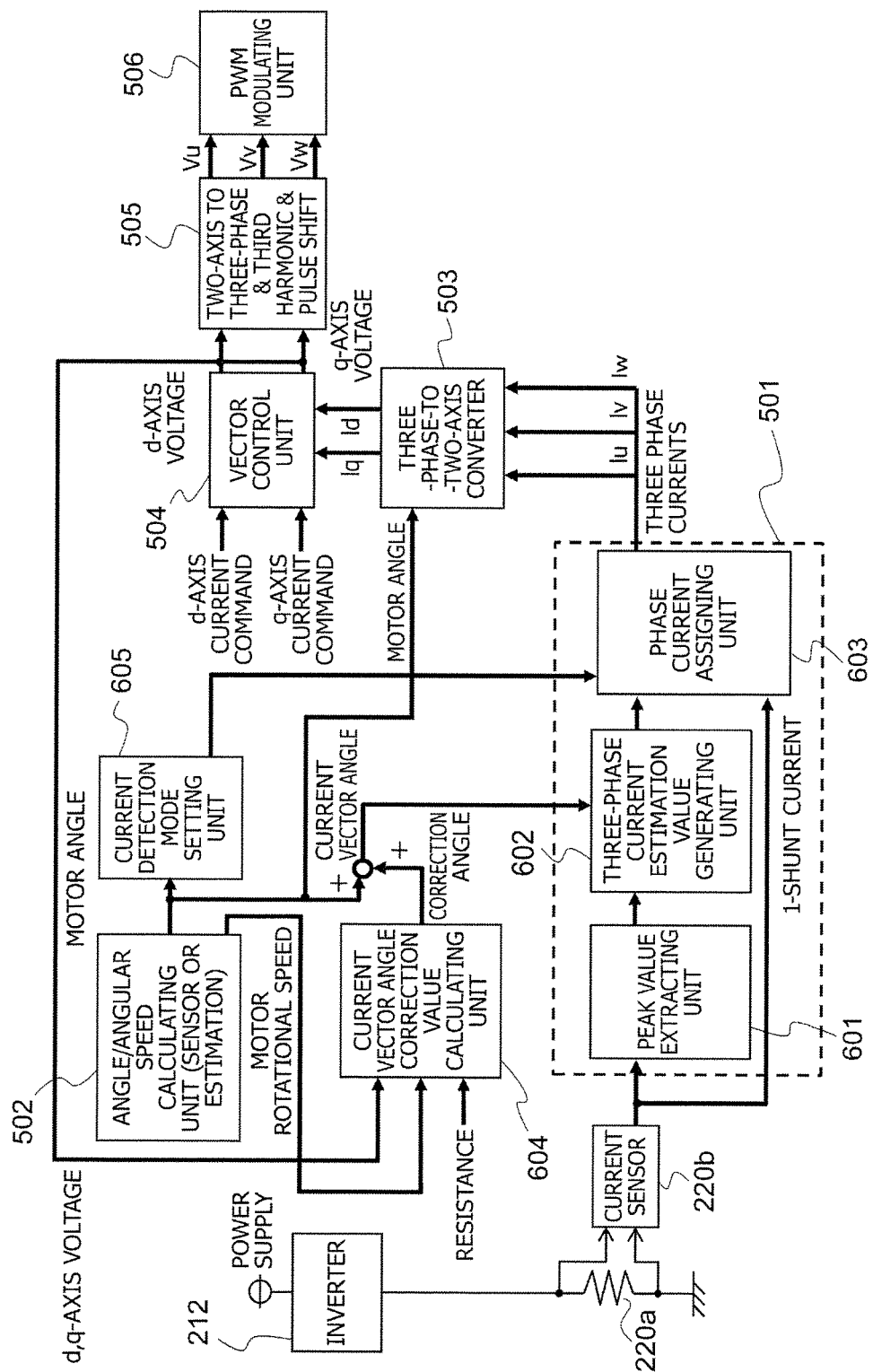
FIG. 3 is a functional block diagram illustrating PWM control for a three-phase brushless motor according to the embodiment of the present invention.

FIG. 3 is a functional block diagram illustrating processing for setting three-phase voltage Vu, Vv, Vw through vector control, by means of control unit 213.

In FIG. 3, a three-phase current detecting unit 501 detects phase currents of three phases based on an A/D-converted value (DC bus current of inverter 212a) of an output of detection circuit 220b.

An angle/angular speed calculating unit 502 estimates a motor angle (magnetic pole position) and an angular speed (motor rotational speed).

Figure 4:
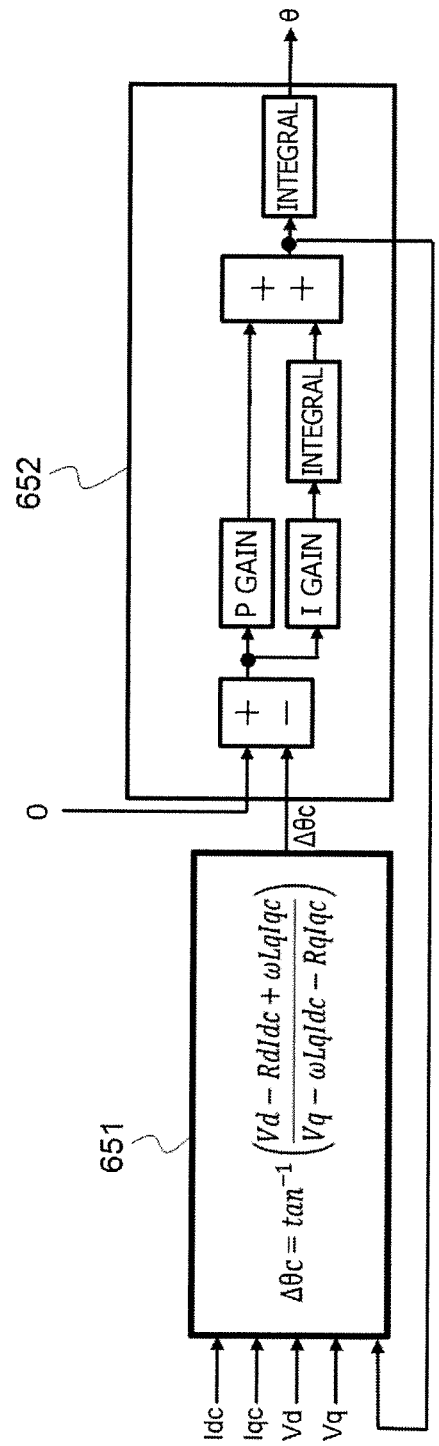
FIG. 4 is a functional block diagram illustrating processing for calculating motor angle according to the embodiment of the present invention.

As illustrated in FIG. 4, angle/angular speed calculating unit 502 includes an axial error estimating unit 651 and a position/speed estimating unit 652.

Axial error estimating unit 651 receives a d-axis current detection value Idc, a q-axis current detection value Iqc, a d-axis input voltage Vd, a q-axis input voltage Vq, and a motor rotational speed ω.

Then, axial error estimating unit 651 calculates an axial error Δθc by Equation 1.

$$\Delta\theta c = \tan^{-1}\left(\frac{Vd - RdIdc + \omega LqIqc}{Vq - \omega LqIdc - RqIqc}\right) \quad (1)$$

where Rd is a d-axis resistance, Rq is a q-axis resistance, Ld is a d-axis inductance, and Lq is a q-axis inductance.

A position/speed estimating unit 652 calculates a motor angle (magnetic pole position) θ based on axial error Δθc (positional estimation error).

Position/speed estimating unit 652 adds a value obtained by multiplying a difference between axial error Δθc and a reference value by a proportional gain, and an integral value of a value obtained by multiplying the difference between axial error Δθc and the reference value by an integral gain, and then integrates the added value so as to determine motor angle (magnetic pole position) θ.

Note that control unit 213 can determine that three-phase brushless motor 2 loses synchronization in case axial error Δθc remains higher than a predetermined value for a pre-determined time or more and/or in case a change amount of axial error Δθc per unit time becomes higher than a prede-termined value successively a predetermined number of times.

Also, if three-phase brushless motor 2 has a magnetic pole position sensor, angle/angular speed calculating unit 502 detects a motor angle (magnetic pole position) and an angular speed (motor rotational speed) based on an output of the magnetic pole position sensor.

A three-phase-to-two-axis converter 503 of FIG. 3 converts detection values of three phase currents, obtained from three-phase current detecting unit 501, into current Id, Iq on a two-axis rotating coordinate system (d-q coordinate system) based on corresponding motor angle (magnetic pole position) θ.

A vector control unit 504 receives a target current (d-axis command current, q-axis command current) corresponding to a command torque, the angular speed calculated by angle/angular speed calculating unit 502, and current Id, Iq obtained by three-phase-to-two-axis converter 503.

Then, vector control unit 504 calculates a d-axis current command value Idref and a q-axis current command value Iqref on the d-q coordinate system based on the target current and angular speed, and then determines command voltage Vq, Vd based on the result of comparing d-axis current command value Idref and q-axis current command value Iqref with actual current Id, Iq obtained by three-phase-to-two-axis converter 503.

A two-axis-to-three-phase converter 505 converts command voltage Vq, Vd into three-phase voltage Vu, Vv, Vw to output the converted voltage. A PWM modulating unit 506 compares three-phase voltage Vu, Vv, Vw as modulated waves with a triangular wave carrier so as to produce a switching gate waveform for driving the switching elements of inverter 212a.

Equation 2 is an example of arithmetic equation for calculating command voltage Vq, Vd in vector control unit 504.

$$\begin{bmatrix} Vd \\ Vq \end{bmatrix} = \begin{bmatrix} Kpd(0 - Idc) + Kid(0 - Idc)*1/s - \omega LqIqc \\ kpq(\text{command torque}/Kt - Iqc) + \\ Kiq(\text{command torque}/Kt - Iqc)*1/s + \omega LdIdc + Ke\omega \end{bmatrix} \quad (2)$$

where Vd is a d-axis input voltage, Vq is a q-axis input voltage, kpd is a proportional gain of d-axis current feedback, kpq is a proportional gain of q-axis current feedback, kid is an integral gain of d-axis current feedback, kiq is an integral gain of q-axis current feedback, Idc is a d-axis current detection value, Iqc is a q-axis current detection value, Ld is a d-axis inductance, Lq is a q-axis inductance, ω is a motor rotational speed (rad/sec), Ke is an induced voltage constant, and 1/s is integration.

Described below is detailed processing for determining three phase currents with three-phase current detecting unit 501 of control unit 213 based on an output of current sensor 220 for detecting the DC bus current of inverter 212a.

As illustrated in FIG. 3, three-phase current detecting unit 501 includes a peak value extracting unit 601, a three-phase current estimation value generating unit 602, and a phase current assigning unit 603.

An output (analog voltage signal) of detection circuit 220b of current sensor 220 is, as described later, A/D-converted at a detection timing that is set once per PWM control cycle and read by peak value extracting unit 601 and phase current assigning unit 603.

Peak value extracting unit 601 extracts a peak value of each phase current based on current detection values obtained in time series and then outputs the value to three-phase current estimation value generating unit 602.

Three-phase current estimation value generating unit 602 receives the peak value of each phase current as well as current vector angle θ [deg] (motor angle [deg (electric angle)]) to obtain estimation values for three phase currents based on the following equations.

*U*-phase current estimation value=−sin(current vector angle)*phase current peak value

*V*-phase current estimation value=−sin(current vector angle−120 [deg])*phase current peak value

*W*-phase current estimation value=−sin(current vector angle−240 [deg])*phase current peak value The phase currents in three-phase brushless motor 2 are controlled through vector control into sine waves having a phase difference of 120 deg in electric angle. At this time, they involve phase shift relative to the motor angle. Thus, three-phase current estimation value generating unit 602 receives current vector angle (motor angle) θ compensated by the phase shift. This makes it possible to obtain phase current estimation values, taking into account the phase shift.

A current vector angle correction value calculating unit 604 calculates a current vector angle correction value Δθ corresponding to the phase shift, and outputs the calculated value. Current vector angle correction value Δθ is added to an actual motor angle [deg (electric angle)] θac. The addition result is input as final current vector angle (motor angle) θ to three-phase current estimation value generating unit 602. Three-phase current estimation value generating unit 602 calculates a phase current estimation value for each phase based on current vector angle (motor angle) θ that has been corrected using current vector angle correction value Δθ.

Current vector angle correction value calculating unit 604 calculates correction value Δθ based on the resistance, the motor rotational speed, the d-axis voltage, and the q-axis voltage. In other words, the current vector angle (motor angle used to calculate the phase current estimation value) is corrected according to the resistance, the motor rotational speed, the d-axis voltage, and the q-axis voltage.

Phase current assigning unit 603 receives phase current estimation values for three phases obtained by three-phase current estimation value generating unit 602 and further receives an output of detection circuit 220b of current sensor 220, which has been A/D-converted at a detection timing that is set once per PWM control cycle.

Then, phase current assigning unit 603 assigns a current detection value from current sensor 220 to one of the three phases in three-phase brushless motor 2 based on a current detection mode command from a current detection mode setting unit 605, while assigning phase current estimation values obtained by three-phase current estimation value generating unit 602 to the remaining two phases. The current detection mode command is a signal indicating one of the three phases to which a current detection value from current sensor 220 will be assigned as its phase current.

To elaborate the processing in three-phase current detecting unit 501, current sensor 220 detects a phase current for one of the three phases, and phase currents for the remaining two phases are estimated from the phase current detected by current sensor 220. Also, a phase for which current sensor 220 directly detects a phase current is switchingly chosen depending on the current detection mode command.

Phase current values of three phases determined by phase current assigning unit 603 are output to three-phase-to-two-axis converter 503. Three-phase two-axis converter 503 converts the received three phase current values into current Id, Iq on the two-axis rotating coordinate system (d-q coordinate system) and vector control unit 504 performs vector control using current Id, Iq.

Figure 5:
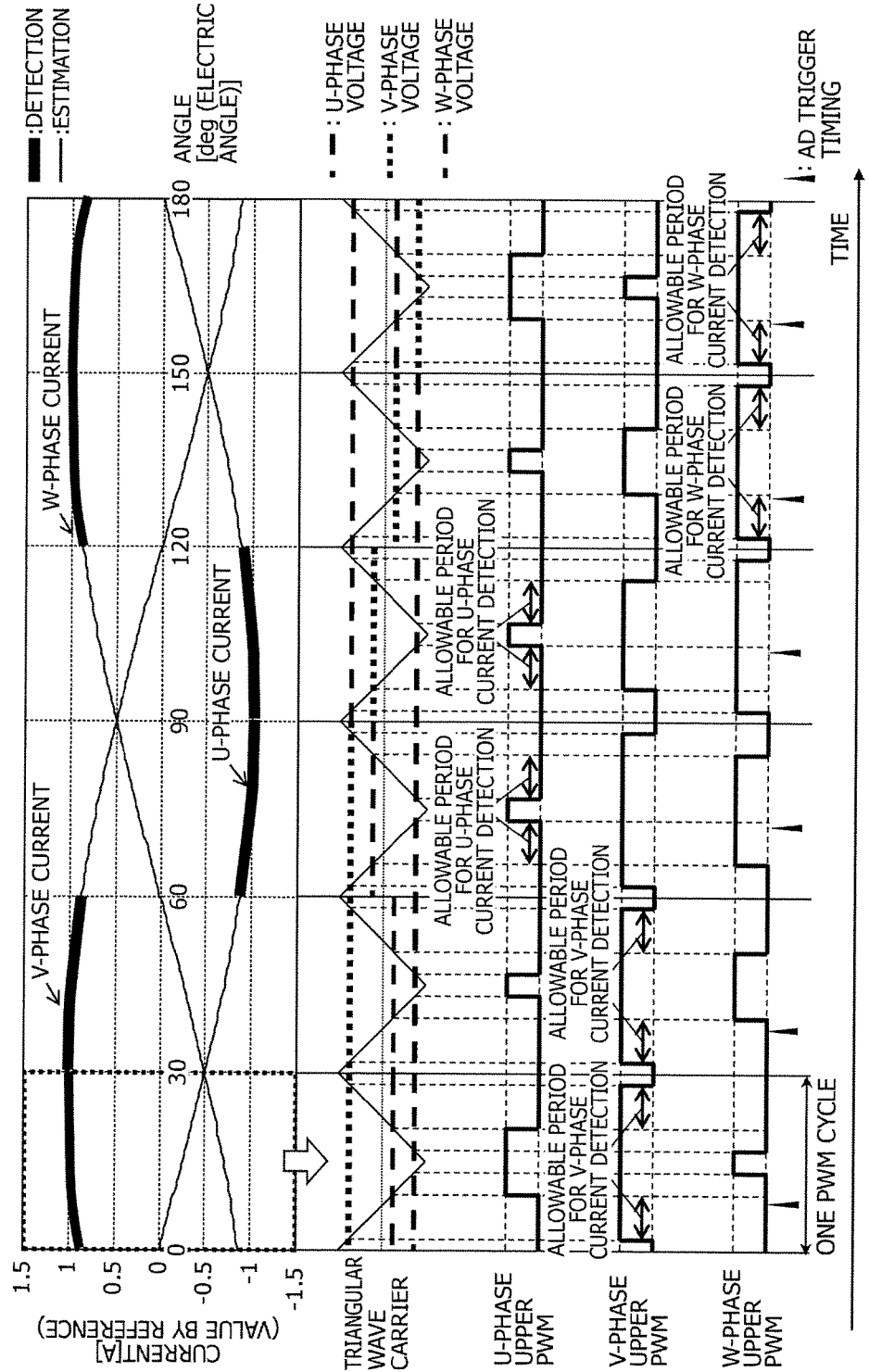
FIG. 5 is a timing chart illustrating a timing for controlling a switching element in an inverter and a timing for A/D-converting an output current detection value according to the embodiment of the present invention.

In the above configuration, an output (analog voltage signal) of detection circuit 220b of current sensor 220 is A/D-converted at a detection timing that is set once per PWM control cycle (per carrier cycle). FIG. 5 illustrates such a detection timing (A/D conversion timing).

Note that a phase current flowing into a neutral point is represented by positive value, and a phase current flowing out of the neutral point is represented by negative value herein.

Regarding PWM control by control unit 213, three-phase command voltage Vu, Vv, Vw is set through vector control so that phase currents of three phases show sine waves having phase shift of 120 deg in electric angle. This produces a switching gate waveform. According to this waveform, a period in which three-phase command voltage Vu, Vv, Vw is higher than the triangular wave carrier is set to an ON period for an upper arm of each phase. Note that a lower arm of each phase is driven inversely to the upper arm.

During a period from 0 deg to 60 deg in electric angle of FIG. 5, a phase current of a V phase among the three phases is highest. Moreover, during a period in which the upper arm of the V phase is set ON while the upper arms of U and W phases are set OFF in the period from 0 deg to 60 deg in electric angle, i.e., during a period in which a current flowing from a power supply to the V phase passes through the neutral point and divides into two to flow into the U and W phases, current sensor 220 detects a phase current of the V phase.

Note that the period, in which the upper arm of the V phase is set ON while the upper arms of the U and W phases are set OFF, appears on both sides of the valley of the triangular wave. Thus, current sensor 220 can detect the phase current of the V phase independently at two separate periods within one PWM control cycle (one carrier cycle).

Hence, in the period from 0 deg to 60 deg in electric angle (i.e., the period in which the phase current of the V phase is highest), control unit 213 sets a detection timing for a phase current within a previous one (or later one) of the two periods, in one PWM control cycle (carrier cycle), in which the upper arm of the V phase is set ON while the upper arms of the U and W phases are set OFF. Then, an output of current sensor 220 is A/D-converted once per PWM control cycle and read by control unit 213.

At the above detection timing, current sensor 220 detects the phase current of the V phase, and a phase current obtained from an output of current sensor 220 is assigned to a phase current of the V phase, and phase current estimation values calculated from the peak value of the phase current detection value are assigned to the U and W phases. Specifically, the period from 0 deg to 60 deg in electric angle corresponds to a period of the current detection mode in which the current detection value from current sensor 220 is assigned to the V phase.

In FIG. 5, during a period from 60 deg to 120 deg in electric angle, a phase current of the U phase among the three phases is lowest. Moreover, in a period in which the upper arms of the V and W phases are set ON while the upper arm of the U phase is set OFF, i.e., a current flowing from the power supply into the V phase and W phase merges at the neutral point to flow into the U phase during the above period from 60 deg to 120 deg in electric angle, current sensor 220 detects a phase current of the U-phase.

Thus, control unit 213 sets a detection timing for a phase current in a previous one (or later one) of two periods in which the upper arms of the V and W phases are set ON and the upper arm of the U phase is set OFF within one PWM control cycle (carrier cycle) during the period from 60 deg to 120 deg in electric angle (i.e., the period in which the phase current of the U phase is lowest). Then, an output of current sensor 220 is A/D-converted once per PWM control cycle and read by control unit 213.

At the above detection timing, current sensor 220 detects a phase current of the U phase and thus, a phase current calculated from an output of current sensor 220 is assigned to the phase current of the U phase, and phase current estimation values calculated from the peak value of the phase current detection value are assigned to the remaining V and W phases. Specifically, the period from 60 deg to 120 deg in electric angle corresponds to a period of the current detection mode for assigning the current detection value from current sensor 220 to the U-phase.

During a period from 120 deg to 180 deg in electric angle in FIG. 5, a phase current of the W phase among the three phases is highest. Further, in a period in which the upper arm of the W phase is set ON and the upper arms of the U and V phases are set OFF during the period from 120 deg to 180 deg in electric angle, i.e., a period in which a current flowing into the W phase from the power supply passes through the neutral point and divides into two to flow into the V and U phases, current sensor 220 detects a phase current of the W-phase.

Thus, control unit 213 sets a detection timing for a phase current in a previous one (or later one) of two periods in which the upper arm of the W phase is set ON and the upper arms of the U and V phases are set OFF within one PWM control cycle (carrier cycle).

Then, an output of current sensor 220 is A/D-converted once per PWM control cycle and read by control unit 213 as a phase current value of the W phase. Regarding the remaining V and U phases, phase current estimation values calculated from the peak value of the phase current detection value are assigned. Specifically, the period from 120 deg to 180 deg in electric angle corresponds to a period of the current detection mode for assigning the current detection value from current sensor 220 to the W phase.

Phase currents can be assigned, in the same way as above, for period(s) from 180 deg (in electric angle) onward although not illustrated in FIG. 5.

During a period from 180 deg to 240 deg in electric angle, a phase current of the V phase among the three phases is lowest. In this period, control unit 213 sets a detection timing for a phase current in a previous one (or later one) of two periods in which the upper arms of the U and W phases are set ON and the upper arm of the V phase is set OFF within one PWM control cycle (carrier cycle) as well as a current flowing from the power supply into the U and W phases merges at the neutral point to flow into the V phase. Then, an output of current sensor 220 is A/D-converted once per PWM control cycle and read by control unit 213 as a phase current value of the V phase while phase current estimation values calculated from the peak value of the phase current detection value are assigned to the remaining U and W phases.

During a period from 240 deg to 300 deg in electric angle, a phase current of the U phase among the three phases is highest. Control unit 213 sets a detection timing for a phase current in a previous one (or later one) of two periods in which the upper arm of the U phase is set ON and the upper arms of the V and W phases are set OFF within one PWM control cycle (carrier cycle) as well as a current flowing from the power supply to the U phase passes through the neutral point and divides into two to flow into the V and W phases. Then, an output of current sensor 220 is A/D-converted once per PWM control (carrier cycle) and read by control unit 213 as a phase current value of the U phase, and phase current estimation values calculated from the peak value of the phase current detection value are assigned to the remaining V and W phases.

During a period from 300 deg to 360 deg in electric angle, a phase current of the W phase among the three phases is lowest. Control unit 213 sets a detection timing for a phase current in a previous one (or later one) of two periods in which the upper arms of the V and U phases are set ON and the upper arm of the W phase is set OFF within one PWM control cycle (carrier cycle) as well as a current flowing from the power supply to the V and U phases merges at the neutral point to flow into the W phase. Then, an output of current sensor 220 is A/D-converted once per PWM control cycle and read by control unit 213 as a phase current value of the W phase, and phase current estimation values calculated from the peak value of the phase current detection value are assigned to the remaining V and U phases.

As mentioned above, a phase, a phase current absolute value of which becomes maximum is switched at every 60 deg in electric angle, and control unit 213 sets one detection timing (A/D conversion trigger timing) per PWM control cycle, at which timing a phase current for one phase, a phase current absolute value of which becomes maximum at a corresponding electric angle can be determined from an output detection value of current sensor 220. Then, control unit 213 A/D-converts and reads a phase current detection value and assigns the resultant value to one phase a phase current absolute value of which becomes maximum, while estimating phase currents of the remaining two phases, not detected by current sensor 220, from the phase current detection value.

Here, two groups are conceivable: one for three periods of 60 deg in electric angle in which a phase current of one of the U, V, and W phases is highest and the other for three periods of 60 deg in electric angle in which a phase current of one of the U, V, and W phases is lowest. Control unit 213 sets current detection modes corresponding to these six patterns and as described later, determines one phase to which a phase current detection value is assigned according to a corresponding current detection mode.

Next described is detailed processing for estimating, from a phase current detection value of one phase, phase currents of the remaining two phases.

Figure 6:
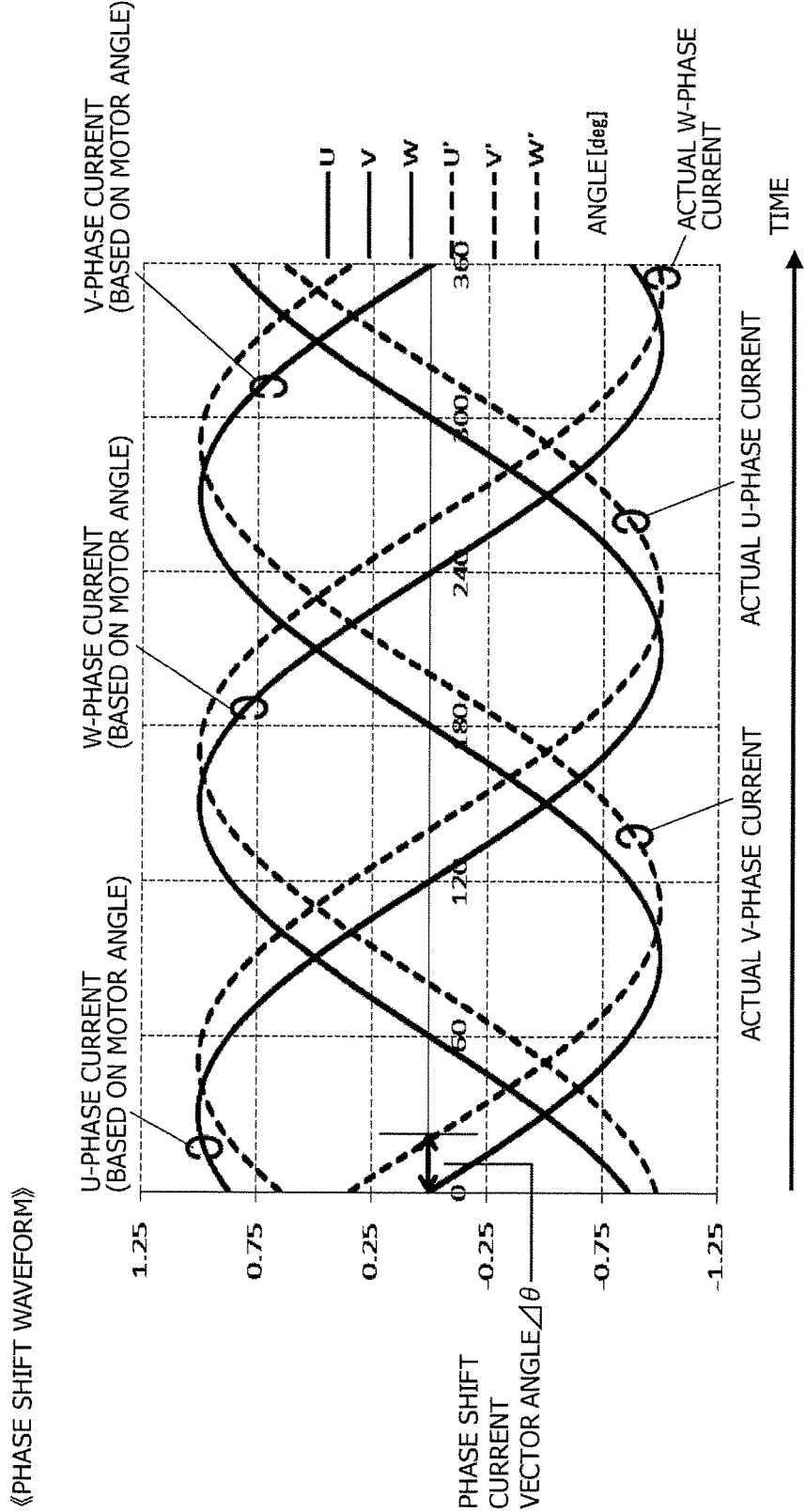
FIG. 6 is a timing chart illustrating as an example a phase shift of actual phase current of each phase relative to motor angle according to the embodiment of the present invention.

The solid line of FIG. 6 indicates an ideal sinusoidal waveform of a phase current with no phase shift relative to the motor angle. The ideal sinusoidal waveform of a phase current can be obtained based on the peak value of a phase current and the motor angle [deg (electric angle)] by the following equations.

Figure 7:
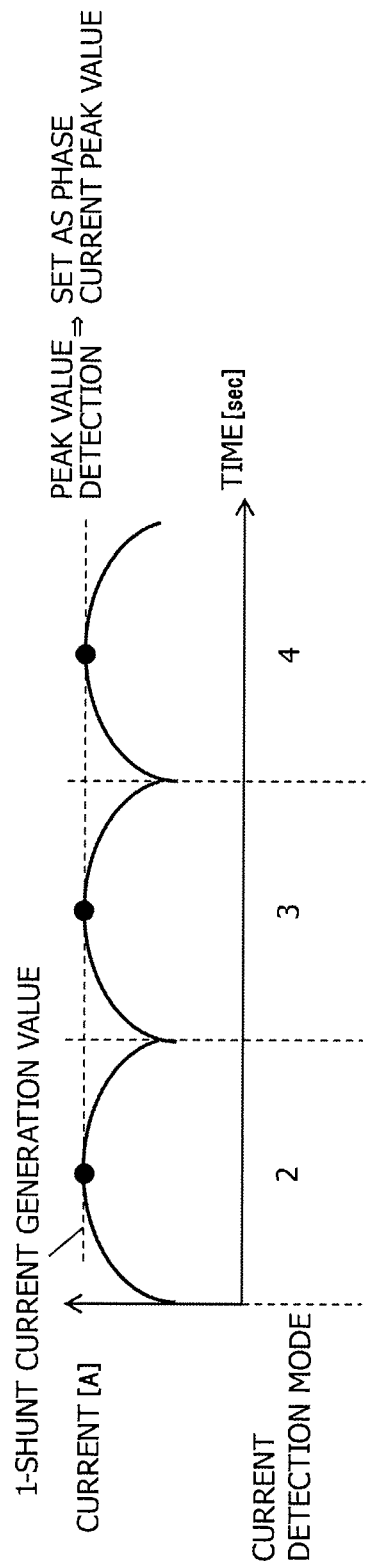
FIG. 7 is a timing chart illustrating processing for detecting a peak current according to the embodiment of the present invention.

$U$-phase current estimation value=−sin(actual motor angle)*phase current peak value $V$-phase current estimation value=−sin(actual motor angle−120 [deg])*phase current peak value $W$-phase current estimation value=−sin(actual motor angle−240 [deg])*phase current peak value Contrary to the ideal sinusoidal waveform of the phase current, an actual waveform of a phase current has phase shift as indicated by the dotted line of FIG. 6. Provided that the motor angle [deg (electric angle)] (current vector angle)

corresponding to the phase shift is indicated by Δθ, the actual phase current value can be calculated by the following equations:

$U$-phase current estimation value=−sin(actual motor angle+Δθ)*phase current peak value $V$-phase current estimation value=−sin(actual motor angle+Δθ−120 [deg])*phase current peak value $W$-phase current estimation value=−sin(actual motor angle+Δθ−240 [deg])*phase current peak value Here, the peak value of the phase current can be calculated as a peak value of a phase current directly detected by current sensor 220. The phase current directly detected by current sensor 220 is switched at every 60 deg in electric angle as mentioned above. As illustrated in FIG. 7, control unit 213 calculates the peak value (local maximum value; maximum value) of phase currents of one phase that are detected during the period of 60 deg in electric angle so as to estimate a phase current using the peak value.

Also, control unit 213 sets a current detection mode for switchingly setting a phase, to which a phase current directly detected by current sensor 220 is assigned, at every 60 deg in electric angle based on control duties of the three phases (i.e., command voltage Vu, Vv, Vw of the respective phases).

To be specific, in the illustrated example of FIG. 8, a first current detection mode is set to a period of 60 deg in electric angle (period from 300 to 360 deg in electric angle) in which control duties of both the V and U phases (control duties of upper arms) exceed 50%, and a control duty of the W phase is below 50%. Also, a second current detection mode is set to a period of 60 deg in electric angle (period from 0 to 60 deg in electric angle) in which control duties of both the U and W phases are below 50%, and a control duty of the V phase exceeds 50%. A third current detection mode is set to a period (period from 60 to 120 deg in electric angle) in which control duties of both the V and W phases exceed 50% and a control duty of the U phase is below 50%.

Also, a fourth current detection mode is set to a period of 60 deg in electric angle (period from 120 to 180 deg in electric angle) in which control duties of the V and U phases are below 50%, and a control duty of the W phase exceeds 50%. A fifth current detection mode is set to a period of 60 deg in electric angle (period from 180 to 240 deg in electric angle) in which control duties of both the U and W phases exceed 50%, and a control duty of the V phase is below 50%. A sixth current detection mode is set to a period of 60 deg in electric angle (period from 240 to 300 deg in electric angle) in which control duties of both the V and W phases are below 50%, and a control duty of the U phase exceeds 50%.

As illustrated in FIG. 9, control unit 213 determines, for each current detection mode, one phase to which a phase current detection value is assigned, and assigns the phase current estimation values to the remaining two phases.

For example, in the period of the second current detection mode, a phase current of the V phase can be detected from an output of current sensor 220 in the period (V-phase current detection period) in which a phase current of the V phase is highest in the three phases as well as the upper arm of the V phase is set ON, and the upper arms of the U and W phases are set OFF.

Then, in the second current detection mode, control unit 213 sets one detection timing for a V-phase current per PWM control cycle within the V-phase current detection period. After that, control unit 213 A/D-converts and reads a phase current detection value at such detection timing to thereby assign this value to a phase current value of the V phase.

During the period of the third current detection mode, the phase current of the U phase can be determined from an output of current sensor 220 in the period (U-phase current detection period) in which a phase current of the U phase is lowest in the three phases as well as the upper arms of the V and W phases are set ON and the upper arm of the U phase is set OFF.

Then, in the third current detection mode, control unit 213 sets one, detection timing for a U-phase current per PWM control cycle within the U-phase current detection period. After that, control unit 213 A/D-converts and reads a phase current detection value at such detection timing to thereby assign this value to a phase current value of the U phase.

Note that in the period of the third current detection mode, a current flowing from the neutral point into the U phase is detected. Assuming that the flow direction of such current is shown as negative, the phase current detection value of the U phase is obtained by multiplying a current detection value from current sensor 220 by −1.

Similar to the above, in the period of the fourth current detection mode, a current detection value from current sensor 220 is assigned to a phase current value of the W phase; in the period of the fifth current detection mode, a current detection value from current sensor 220 is multiplied by −1 and assigned to a phase current value of the V phase; in the period of the sixth current detection mode, a current detection value from current sensor 220 is assigned to a phase current value of the U phase; in the period of the first current detection mode, a current detection value from current sensor 220 is multiplied by −1 and assigned to a phase current value of the W phase.

Moreover, as illustrated in FIG. 7, control unit 213 calculates a peak value (local maximum value; maximum value) of a current detection value from current sensor 220 at a period of each current detection mode.

For example, in the period of the second current detection mode, a phase current of the V phase is determined from an output of current sensor 220 per PWM control cycle. Thus, a peak value is derived from temporal data regarding a phase current detection value of the V phase in the period of the second current detection mode, and the peak value used to obtain the phase current estimation value is updated by the peak value of the phase current detection value of the V phase.

In the period of the third current detection mode, a phase current of the U phase is determined from an output of current sensor 220 per PWM control cycle. Thus, in the period of the third current detection mode, a peak value is derived from temporal data regarding a phase current detection value of the U phase, and the peak value used to obtain a phase current estimation value is updated by the peak value of the phase current detection value of the U phase.

Similar to the above, in the period of the fourth current detection mode, a peak value of a phase current detection value of the W phase is determined; in the period of the fifth current detection mode, a peak value of a phase current detection value of the V phase is determined; in the period of the sixth current detection mode, a peak value of a phase current detection value of the U phase is determined; in the period of the first current detection mode, a peak value of a phase current detection value of the W phase is determined. The resultant peak value is used to update the peak value for estimating a phase current (i.e., calculating a phase current estimation value).

Then, in the period of the second current detection mode in which the current detection value from current sensor 220 is assigned to the phase current value of the V phase, for example, estimation values, derived from the following equations based on the peak value of a phase current, a corresponding actual motor angle αac [deg (electric angle)], and phase shift (current vector angle correction value) Δθ, are assigned to phase current values of the remaining U and W phases.

U-phase current estimation value=−sin(actual motor angle θac+Δθ)*phase current peak value W-phase current estimation value=−sin(actual motor angle θac+Δθ−240[deg])*phase current peak value To be specific, as illustrated in FIG. 8, a phase to which a current detection value from current sensor 220 is assigned is determined for each current detection mode (each period of 60 deg in electric angle), and phase current values estimated from the phase current peak value, actual motor angle θac (reference current vector angle), and phase shift are assigned to the remaining two phases.

Using current sensor 220 that detects a DC bus current of inverter 212a, an output detection value of current sensor 220 is A/D-converted once per PWM control cycle so as to determine phase currents of three phases.

Accordingly, in the motor drive device that executes vector control based on detection values of three phase currents, the hardware configuration for detecting a phase current can be simplified, and an A/D conversion load on control unit 213 (microcomputer 213b) can be reduced. As the A/D conversion load is reduced, this phase current detection processing is also applicable to a drive device configured by a low-spec (low-price) microcomputer.

Here, detecting a phase current requires a longer time than the total sum of a period necessary for A/D conversion and a current fluctuation period immediately after energization (power-on). In some cases, however, along with a decrease in command voltage (command duty), only a shorter time than the total sum can be ensured and consequently, a phase current cannot be detected.

In such a case, executed is a processing for alternately setting a PWM control cycle in which a duty is set so that a phase current detection period is not shorter than the above total sum and another PWM control cycle in which a duty is set so that a phase current detection period is shorter than the above total sum (hereinafter referred to as pulse shift processing).

Then, a phase current is detected when the duty is set so that a phase current detection period is not shorter than the above total sum, and phase current detection is stopped when the duty is set so that a phase current detection period is shorter than the above total sum. Also, an average duty is controlled to conform to a command duty. With this configuration, however, a phase current can be detected while the duty is controlled into a command duty (command torque).

The above pulse shift processing may cause noise. With the above configuration that carries out one A/D conversion per PWM control cycle, such a duty area as requires pulse shift processing thereby can be reduced as well as noise generated thereby can be reduced compared with the configuration that carries out A/D conversion twice per PWM control cycle to detect a phase current for two phases.

Next, described is detailed processing for calculating phase shift (current vector angle correction value) ΔO, i.e., the processing of current vector angle correction value calculating unit 604.

Equation 3 is to indicate a voltage model of three-phase brushless motor (IPMSM) 2 on the d-q axis.

$$\begin{bmatrix} Vd \\ Vq \end{bmatrix} = \begin{bmatrix} Ra+Las & -\omega La \\ \omega La & Ra+Las \end{bmatrix} \begin{bmatrix} Id \\ Iq \end{bmatrix} + \begin{bmatrix} 0 \\ Ke\omega \end{bmatrix} \quad (3)$$

where Vd is a d-axis voltage [V], Vq is a q-axis voltage [V], Ra is a d, q-axis resistance [Ω], La is a d, q-axis inductance [H], co is a motor rotational speed [rad/sec] (electric angle), Id is a d-axis current [A], Iq is a q-axis current [A], and Ke is an induced voltage constant [V/(rad/sec)] (electric angle).

The above circuit equation (Equation 3) can be resolved into resistance term, interference term (speed-induced voltage term), and induced voltage term as indicated by Equation 4.

$$\begin{bmatrix} Vd \\ Vq \end{bmatrix} = \begin{bmatrix} Ra+Las & 0 \\ 0 & Ra+Las \end{bmatrix} \begin{bmatrix} Id \\ Iq \end{bmatrix} + \begin{bmatrix} 0 & -\omega La \\ \omega La & 0 \end{bmatrix} \begin{bmatrix} Id \\ Iq \end{bmatrix} + \begin{bmatrix} 0 \\ Ke\omega \end{bmatrix} \quad (4)$$

$$\text{Reference term} = \begin{bmatrix} Ra+Las & 0 \\ 0 & RA+Las \end{bmatrix} \begin{bmatrix} Id \\ Iq \end{bmatrix}$$

$$\text{Interference term} = \begin{bmatrix} 0 & -\omega La \\ \omega La & 0 \end{bmatrix} \begin{bmatrix} Id \\ Iq \end{bmatrix}$$

$$\text{Induced voltage term} = \begin{bmatrix} 0 \\ Ke\omega \end{bmatrix}$$

Here, the resistance term stands for a DC component, the interference term for an interference voltage between the d and q axes, and the induced voltage term for an induced voltage that appears on the q axis.

Figure 10:
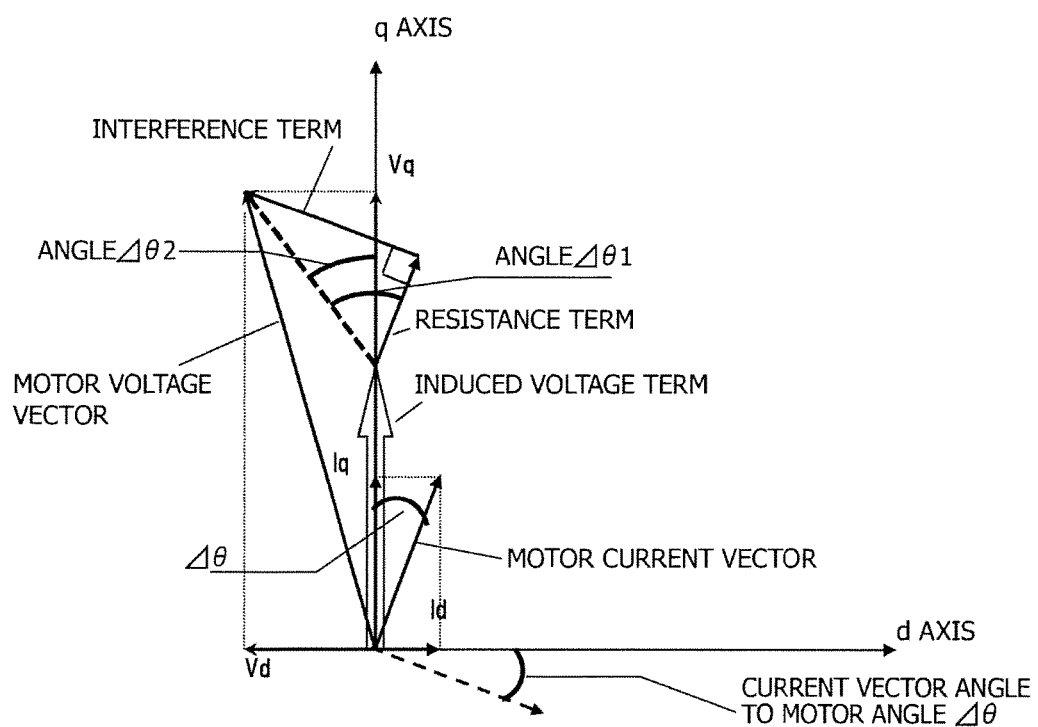
FIG. 10 is a vector plot illustrating a correction value of current vector angle according to the embodiment of the present invention.

Vectors are plotted based on Equation 4. The resultant plot is illustrated in FIG. 10. In the vector plot, it is assumed that d-axis current Id and q-axis current Iq remain unchanged, and the Las term (inductance amplitude) is not considered.

In FIG. 10, the motor angle is a d-axis angle, and phase shift relative to the motor angle (reference current vector angle) is Δθ. By calculating current vector angle correction value Δθ that can compensate for the phase shift, a phase current can be estimated taking into account the phase shift.

A first angle Δθ1 in FIG. 10 is an angle between the resistance term and the interference term. This angle can be calculated by:

Δθ1=tan$^{-1}$(interference term/resistance term)=tan$^{-1}$(ωL/Ra)

In other words, first angle Δθ1 can be derived from d, q-axis resistance Ra, d, q-axis inductance L, and motor rotational speed ω.

Moreover, a second angle Δθ2 in FIG. 10 is an angle between (motor voltage vector-inducted voltage term) and a q-axis vector. This angle is calculated by:

If $Vd \geq 0$,

Δθ2=tan$^{-1}$((Vq−Keω)/Vd)−π/2

If $Vd < 0$,

Δθ2=tan$^{-1}$((Vq−Keω)/Vd)+π/2

Specifically, second angle $\Delta\theta 2$ can be derived from induced voltage information including q-axis voltage Vq, d-axis voltage Vd, motor rotational speed ω, and induced voltage constant Ke.

Then, current vector angle correction value $\Delta\theta$ is calculated as follows: $\Delta\theta = \Delta\theta 2 - \Delta\theta 1$.

Control unit 213 (current vector angle correction value calculating unit 604) calculates first angle $\Delta\theta 1$ based on d, q-axis resistance Ra, d, q-axis inductance L, and motor rotational speed ω, and calculates second angle $\Delta\theta 2$ based on q-axis voltage Vq, d-axis voltage Vd, motor rotational speed ω, and induced voltage constant Ke so as to calculate current vector angle correction value $\Delta\theta$ (phase shift) from angles $\Delta\theta 1$, $\Delta\theta 2$ above.

With the above configuration, even if phase shift is changed due to a change in q-axis voltage Vq, d-axis voltage Vd, or motor rotational speed ω, control unit 213 can calculate a phase current estimation value based on actual phase shift. Thus, a phase current can be estimated with high accuracy.

Note that a memory of control unit 213 stores d, q-axis resistance Ra, d, q-axis inductance L, and induced voltage constant Ke used for calculating angles $\Delta\theta 1$, $\Delta\theta 2$ in advance as constant. Thus, in calculating angles $\Delta\theta 1$, $\Delta\theta 2$, current vector angle correction value $\Delta\theta$ is calculated based on d, q-axis resistance Ra, d, q-axis inductance L, and induced voltage constant Ke read from the memory, and corresponding q-axis voltage Vq, d-axis voltage Vd, and motor rotational speed ω.

Here, d, q-axis resistance Ra varies depending on environmental conditions (such as temperature condition) of three-phase brushless motor 2 and also varies depending on three-phase brushless motor 2. Moreover, when d, q-axis resistance Ra deviates from a reference value (constant in the memory), calculation accuracy for current vector angle correction value $\Delta\theta$ (phase shift) is lowered and in turn, calculation accuracy for a phase current estimation value is lowered.

To overcome such a problem, control unit 213 detects an estimation error of phase current estimation value that occurs due to variations in d, q-axis resistance Ra, and corrects d, q-axis resistance Ra (first angle $\Delta\theta 1$, current vector angle correction value $\Delta\theta$) so that the estimation error is minimized.

If an error of the phase current estimation value is increased, the following may take arise: when a phase current for one phase is switched from a current detection value from current sensor 220 to a phase current estimation value, a large difference (deviation) occurs between the pre-switched value (i.e., phase current detection value) and the switched value (i.e., phase current estimation value).

In this case, control unit 213 can determine whether phase shift changes due to the variation in d, q-axis resistance Ra to advance or retard the phase (i.e., whether d, q-axis resistance Ra is increased or decreased) based on whether any difference (deviation) occurs to increase or decrease an absolute value of a phase current when a phase current for one phase is switched from a phase current detection value to a phase current estimation value.

More specifically, if an absolute value of a phase current is changed to decrease stepwise when a phase current for one phase is switched from a phase current detection value to a phase current estimation value, that is, if a phase current estimation value becomes smaller than a phase current detection value at the switching time, it can be said that a phase of the phase current estimation value is delayed relative to that of an actual phase current. Thus, control unit 213 corrects d, q-axis resistance Ra so as to advance the phase of the phase current estimation value.

In contrast, if an absolute value of a phase current is changed to increase stepwise when a phase current for one phase is switched from a phase current detection value to a phase current estimation value, that is, if a phase current estimation value becomes larger than a phase current detection value at the switching time, it can be said that a phase of the phase current estimation value advances relative to that of an actual phase current. Thus, control unit 213 corrects d, q-axis resistance Ra so as to retard the phase of the phase current estimation value.

Here, in case of decreasing d, q-axis resistance Ra used for calculating a phase current estimation value, a phase of the phase current estimation value advances. In contrast, in case of increasing d, q-axis resistance Ra used for calculating a phase current estimation value, a phase of the phase current estimation value is delayed.

Thus, in case an absolute value of a phase current is changed to decrease stepwise when a phase current value for one phase is switched from a phase current detection value to a phase current estimation value, by which a phase of the phase current estimation value has to advance to get close to the phase current detection value, control unit 213 executes correction to decrease actual d, q-axis resistance Ra by a predetermined value $\Delta$Ra.

On the other hand, in case an absolute value of a phase current is changed to increase stepwise when a phase current for one phase is switched from a phase current detection value to a phase current estimation value, by which a phase of the phase current estimation value has to be delayed to get close to the phase current detection value, control unit 213 executes correction to increase actual d, q-axis resistance Ra by a predetermined value $\Delta$Ra.

Note that control unit 213 can change predetermined value $\Delta$Ra which is added to or subtracted from d, q-axis resistance Ra upon correction, according to an amount of stepwise change (step) of a phase current at the time of switching a phase current value for one phase from a phase current detection value to a phase current estimation value. In other words, if predetermined value $\Delta$Ra increases proportional to an absolute value of the stepwise change amount of a phase current, a phase of a phase current estimation value can come close to that of a phase current detection value with a high responsiveness.

FIG. 11 illustrates results of determining a change amount of a phase current for each pattern of switching current detection modes and the direction of correcting a phase of a phase current estimation value based on the determination results.

A phase current for the W phase is switched from a phase current detection value to a W-phase current estimation value when the first current detection mode shifts to the second current detection mode and the fourth current detection mode shifts to the fifth current detection mode. Thus, control unit 213 compares the pre-switched, phase current detection value with the switched, W-phase current estimation value.

Here, if a value obtained by subtracting an absolute value of the switched, W-phase current estimation value (present value) from an absolute value of the pre-switched, phase current detection value (previous value) is below a predetermined value $\Delta$Im ($\Delta$Im<0) (|previous Iw|−|present Iw|<$\Delta$Im), that is, an absolute value of the switched, W-phase current estimation value is larger by a predetermined value or more than that of the pre-switched, phase current detection value, and a phase current for the W-phase is increased stepwise, it can be said that the phase of the W-phase current estimation value advances relative to that of an actual W-phase current. Thus, control unit 213 corrects d, q-axis resistance Ra so as to retard the phase of the phase current estimation value.

On the other hand, a value obtained by subtracting an absolute value of the switched, W-phase current estimation value (present value) from an absolute value of the pre-switched, phase current detection value (previous value) is larger than predetermined value $\Delta$Ip ($\Delta$Ip>0) (|previous Iw|−|present Iw|>$\Delta$Ip), that is, an absolute value of the switched, W-phase current estimation value is smaller by the predetermined value or more than that of the pre-switched, phase current detection value, and a phase current for the W-phase is decreased stepwise, the phase of the W-phase current estimation value is delayed from that of an actual W-phase current. Thus, control unit 213 corrects d, q-axis resistance Ra to advance the phase of the phase current estimation value.

If the following conditions are satisfied: |previous Iw|−|present Iw|≥$\Delta$Im and |previous Iw|−|present Iw|≤$\Delta$Ip, it can be said that a difference (deviation) between the W-phase current estimation value and the phase current detection value is within an allowable range around zero and a phase current estimation value is calculated with high accuracy, i.e., d, q-axis resistance Ra used for calculating a phase current estimation value is very close to an actual value. In this case, control unit 213 maintains present d, q-axis resistance Ra instead of correcting the same.

Also, in case the second current detection mode shifts to the third current detection mode, and the fifth current detection mode shifts to the sixth current detection mode, a phase current for the V phase is switched from a phase current detection value to a V-phase current estimation value. Thus, control unit 213 compares the pre-switched, phase current detection value with the switched, V-phase current estimation value.

At the time of switching a V-phase current value from a detection value to an estimation value, control unit 213 compares a value obtained by subtracting an absolute value of the switched, V-phase current estimation value (present value) from an absolute value of the pre-switched, phase current detection value (previous value) with predetermined value $\Delta$Im, $\Delta$Ip similarly to the switching of the W-phase current value. By this comparison, control unit 213 determines whether a phase of the V-phase current estimation value advances or is delayed by a predetermined value or more relative to a phase of an actual V-phase current or whether a phase of the V-phase current estimation value is very close to a phase of the actual V-phase current.

If the phase of the V-phase current estimation value advances or is delayed by a predetermined value or more relative to the phase of the actual V-phase current, control unit 213 corrects d, q-axis resistance Ra so as to decrease such a phase difference.

Also, at the time of switching from the third current detection mode to the fourth current detection mode and from the sixth current detection mode to the first current detection mode, a phase current for the U phase is switched from a phase current detection value to a U-phase current estimation value. Thus, control unit 213 compares the pre-switched, phase current detection value with the switched, U-phase current estimation value.

At the time of switching the U-phase current value from the detection value to the estimation value, control unit 213 compares a value obtained by subtracting an absolute value of the switched, U-phase current estimation value (present value) from an absolute value of the pre-switched, phase current detection value (previous value) with predetermined value $\Delta$Im, $\Delta$Ip similar to the switching of the W-phase current value so as to determine whether a phase of the U-phase current estimation value advances or is delayed by a predetermined value or more relative to a phase of an actual U-phase current or whether the phase of the U-phase current estimation value is very close to the phase of the actual U-phase current.

Then, if the phase of the U-phase current estimation value advances or is delayed by a predetermined value or more relative to the phase of the actual U-phase current, control unit 213 corrects d, q-axis resistance Ra so as to decease such a phase difference.

As mentioned above, control unit 213 detects a decline in calculation accuracy for current vector angle correction value $\Delta\theta$ and in turn for a phase current estimation value, which decline will occur due to an error of d, q-axis resistance Ra used for calculating phase current estimation value (current vector angle correction value $\Delta\theta$; resistance term) relative to an actual value, based on a current change at the time of switching a phase current for one phase from a phase current detection value to a phase current estimation value. Then, control unit 213 corrects d, q-axis resistance Ra so that the phase current estimation value gets close to the phase current detection value (actual phase current).

Accordingly, control unit 213 can calculate a phase current estimation value with high accuracy even if the environmental condition (temperature) changes or characteristics of three-phase brushless motor 2 vary. Thus, control unit 213 can control the three-phase brushless motor with uniform accuracy, based on three phase current values.

Note that control unit 213 determines an error of d, q-axis resistance Ra (current vector angle correction value $\Delta\theta$; resistance term) based on a stepwise change in phase current value for a target phase at the time of switching from the phase current detection value to the phase current estimation value as mentioned above. On the other hand, control unit 213 can also determine an error of d, q-axis resistance Ra based on a stepwise change in phase current value for a target phase at the time of switching from the phase current estimation value to the phase current detection value.

Moreover, the resistance value depends on the temperature and thus, control unit 213 can correct d, q-axis resistance Ra (current vector angle correction value $\Delta\theta$; resistance term) according to the temperature condition.

For example, if a temperature sensor for detecting the environmental temperature is provided, control unit 213 can correct d, q-axis resistance Ra (current vector angle correction value $\Delta\theta$; resistance term) depending on the environmental temperature derived from an output of the temperature sensor. Also, control unit 213 executes energization for measuring a resistance value prior to the startup of the three-phase brushless motor and estimates the temperature condition based on a resistance value measured under a reference temperature condition and the measured resistance value so as to correct d, q-axis resistance Ra (current vector angle correction value $\Delta\theta$; resistance term) based on the estimated temperature condition.

Also, in the above configuration, control unit 213 calculates current vector angle correction value $\Delta\theta$ based on q-axis voltage Vq, d-axis voltage Vd, motor rotational speed $\omega$, and the like. On the other hand, current vector angle correction value $\Delta\theta$ can be also set by detecting a phase of the phase current detection value to the motor angle.

More specifically, control unit 213 can calculate current vector angle correction value $\Delta\theta$ based on a phase current detection value at the time of switching a phase current for a certain phase from a phase current detection value to a phase current estimation value (i.e., at an electric angle at which a current detection mode is switched) and a corresponding phase current peak value.

Control unit 213 calculates, based on a phase current detection value just before a phase current for a certain phase is switched from a phase current detection value to a phase current estimation value and a corresponding phase current peak value, a current vector angle ΔθB (see FIG. 12) from the time point (timing) at which the phase current detection value marks a peak value to the time point (timing) of switching the phase current as follows:

$$\Delta\theta B = \arccos(\text{phase current detection value just before switching/peak current})(\Delta\theta B \geq 0)$$

Figure 12:
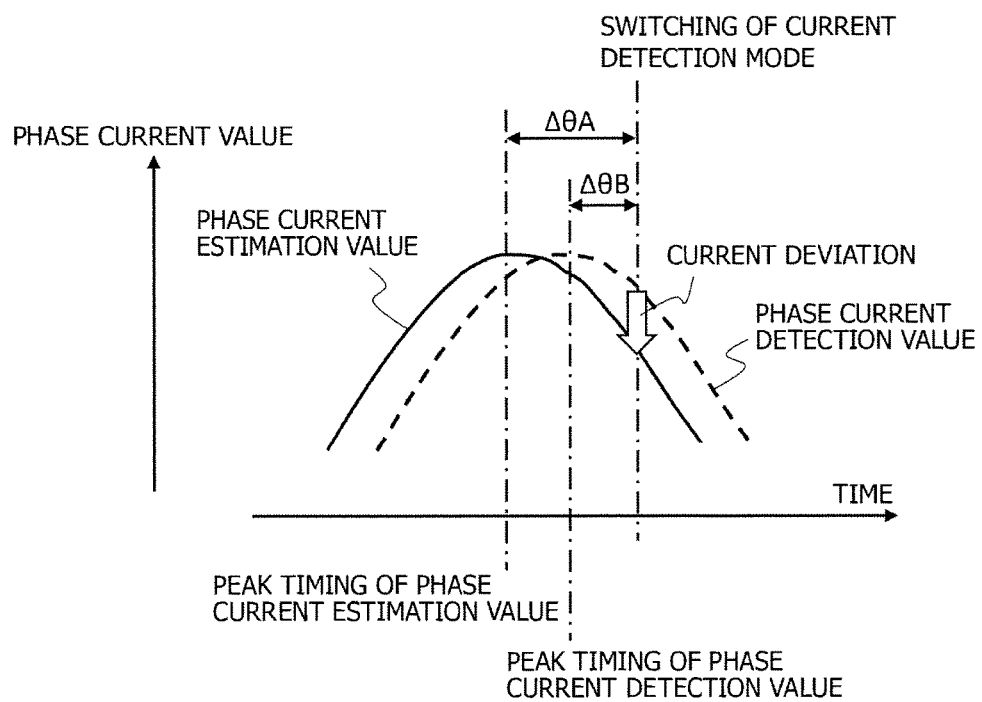
FIG. 12 illustrates phase correction that is performed based on a current peak position according to the embodiment of the present invention.

Moreover, control unit 213 sets as ΔθA an angle of an ideal sine waveform of a phase current having no phase shift relative to the motor angle, or an angle of a phase current estimation value, which is calculated based on present current vector angle correction value Δθ, from the time point (timing) at which the phase current marks a peak value to the time point (timing) of switching from the phase current detection value to the phase current estimation value (i.e., electric angle at which the current detection mode is switched) (see FIG. 12).

Then, control unit 213 calculates current vector angle correction value Δθ and correction value Δθaj based on angles ΔθA and ΔθB above by the following equation.

$$\Delta\theta(\Delta\theta aj) = \Delta\theta A - \Delta\theta B$$

Specifically, in the case of calculating angle ΔθA from the ideal current waveform, the above calculation equation is to calculate an angle from the time point (timing) at which an ideal current waveform marks a peak to the time point at which an actual current waveform marks a peak by subtracting angle ΔθB from the time point (timing) at which the actual current waveform marks a peak to the time point (timing) of switching a current detection mode from angle ΔθA from the time point (timing) at which the ideal current waveform marks a peak to the time point (timing) of switching the current detection mode to thereby detect phase shift of the actual current waveform relative to the ideal current waveform.

Moreover, in the case of calculating angle ΔθA based on a phase current estimation value derived from present current vector angle correction value Δθ, the above calculation equation gives phase shift between an actual phase current waveform and a phase current estimation value, i.e., an error of present current vector angle correction value Δθ. Accordingly, present current vector angle correction value Δθ is corrected based on correction value Δθaj so that a phase current estimation value gets close to an actual phase current waveform.

Note that the following is also conceivable. Regarding the processing for calculating current vector angle correction value Δθ using a phase current detection value obtained at the electric angle for switching a current detection mode and a phase current peak value, the processing is performed when a difference (deviation) of a predetermined value or more is found between a phase current detection value at the time of switching from the phase current detection value to a phase current estimation value and a phase current value of an ideal waveform, i.e., when a phase shift is not smaller than a predetermined value, whereas the processing is inhibited when the difference (deviation) is below the predetermined value.

With a small phase current deviation (phase shift), sensitivity for detecting current vector angle correction value Δθ is low. Also, since current vector angle correction value Δθ is calculated every 60 deg in electric angle, which is a period for switching a current detection mode, if the motor rotational speed is low, the estimation value involves a delay. Therefore, if current vector angle correction value Δθ is updated with a small phase current deviation (phase shift), current control may possibly deviate.

To avoid such a situation, control unit 213 stops updating current vector angle correction value Δθ used for calculating the phase current estimation value in case a difference (deviation) of smaller than a predetermined value is observed between a phase current detection value at the time of switching from the phase current detection value to the phase current estimation value and a phase current value of an ideal waveform or a phase current estimation value.

Also, examples of a motor constant related to current vector angle correction value Δθ include resistance Ra, inductance La, and induced voltage constant Ke as mentioned above. Of these, inductance La does not vary depending on the temperature, but resistance Ra and induced voltage constant Ke vary depending on the temperature.

Control unit 213 estimates the values of resistance Ra and induced voltage constant Ke, which vary depending on the temperature as follows, so as to calculate current vector angle correction value Δθ using the estimation result.

Figure 13:
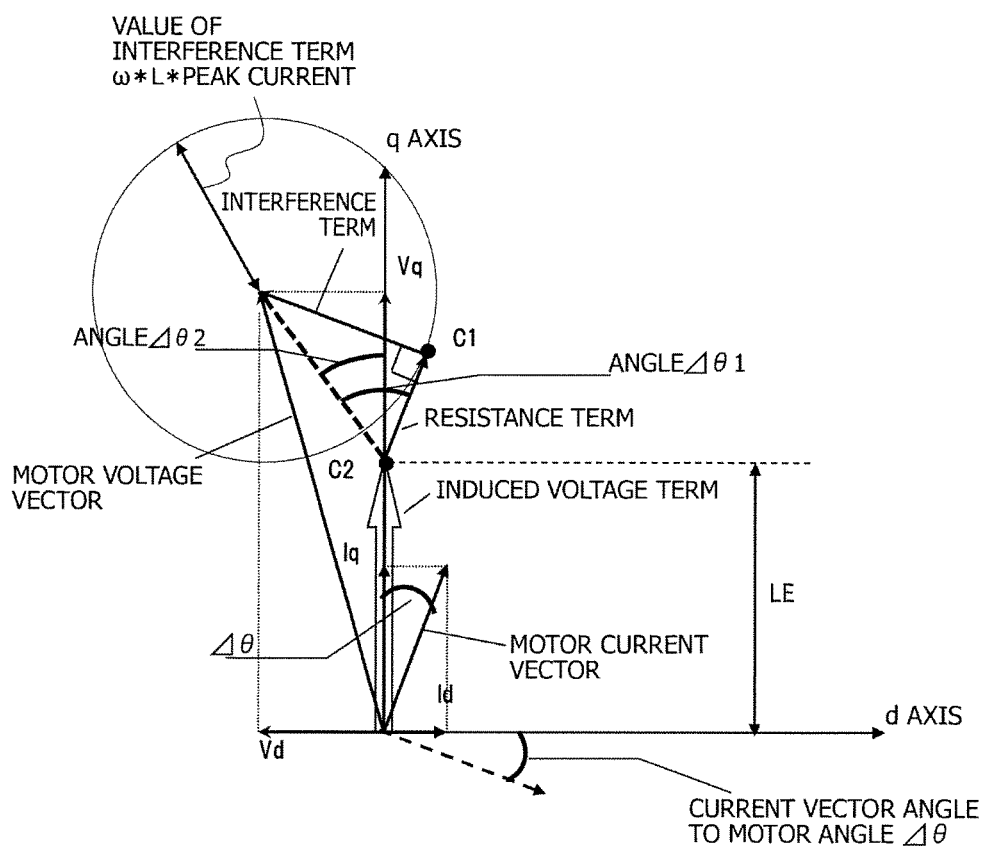
FIG. 13 is a vector plot illustrating processing for estimating a resistance Ra and an induced voltage constant Ke according to the embodiment of the present invention.

As illustrated in the vector plot of FIG. 13, the right angle is formed between the interference term and the resistance term. Thus, if drawing a circle centered at the tip of the motor voltage vector defined by d-axis voltage Vd and q-axis voltage Vq with the radius of ω*La*(phase current peak value), a q-axis section defined by a point C1 where tangent of the circle, or tangent with a tilt to the q axis=tan (Δθ) crosses the q axis corresponds to an induced voltage term. Also, the line connecting crossing point C1 and a contact point C2 corresponds to the resistance term.

Specifically, a length LE of the q-axis section defined by crossing point C1 is an induced voltage term. As induced voltage term=Ke*ω, LE=Ke*ω. Induced voltage constant Ke can be calculated by the following equation based on length LE and corresponding motor rotational speed ω.

$$Ke = LE/\omega$$

Moreover, since resistance term=resistance Ra*phase current peak value Ipeak, a distance D1 between crossing point C1 and contact point C2 satisfies:

Distance $D1$ = resistance $Ra$*phase current peak value $I$peak

Then, resistance Ra can be calculated by the following equation from distance D1 and the phase current peak value.

$$Ra = D1/I\text{peak}$$

Then, control unit 213 stores as constant, induced voltage constant Ke and resistance Ra obtained as above. At the time of calculating current vector angle correction value Δθ based on q-axis voltage Vq, d-axis voltage Vd, and motor rotational speed ω, these constants are used. Thus, current vector angle correction value Δθ can be calculated using induced voltage constant Ke and resistance Ra corresponding to actual environmental temperature, so that an estimation accuracy for a phase current estimation value is improved.

Also, under the condition that resistance Ra has little error, control unit 213 can calculate induced voltage constant Ke based on phase current peak value Ipeak derived from a phase current detection value as follows:

$$Ke = (Vq - \sqrt{(I\text{peak})^2 * (\omega^2 * La^2 + Ra^2) - Vd^2}) / \omega$$

When a phase current estimation value is being calculated using current vector angle correction value Δθ derived from induced voltage constant Ke estimated as above, if resistance Ra changes and a current deviation is observed upon switching between the phase current detection value and the phase current estimation value, control unit 213 calculates current vector angle correction value Δθ using the phase current detection value at the time of switching a current detection mode and the phase current peak value derived from the phase current detection value as mentioned above so as to set current vector angle correction value Δθ, taking into account changes in resistance Ra and induced voltage constant Ke.

Moreover, control unit 213 carries out processing of setting current vector angle correction value Δθ based on above angles ΔθA and ΔθB once, for example, after the startup of three-phase brushless motor 2, and then carries out processing of estimating induced voltage constant Ke and resistance Ra above and further shifts to processing of setting current vector angle correction value Δθ based on estimated induced voltage constant Ke and resistance Ra, and q-axis voltage Vq, d-axis voltage Vd, and motor rotational speed ω.

Moreover, in order to ensure that an allowable period for phase current detection which is not shorter than a predetermined value upon controlling the driving of three-phase brushless motor 2 through the above sinusoidal driving method (180 deg energization method), control unit 213 can drive three-phase brushless motor 2 through sensorless rectangular wave driving method (120 deg energization method) instead of the sensorless sinusoidal driving method in an operation area for which the above pulse shift processing is required (area in which a control duty is below a predetermined value).

The above rectangular wave driving method is to drive brushless motor 2 by sequentially switching, at every, predetermined rotor position, a selection pattern (energization mode) for two phases, among the three phases, to which a pulsed voltage is applied. According to this rectangular wave driving method, control unit 213 obtains positional information on a rotor from a voltage (transformer-induced voltage or pulse-induced voltage) induced to a non-energized phase (open phase) along with the application of a pulsed voltage to energized phases. Then, control unit 213 detects a timing of switching a selection pattern for selecting phases to be energized.

The present invention is described in detail above, referring to the preferred embodiments, but it is obvious that one skilled in the art can make various modifications based on the basic technical idea and teachings.

For example, the following modifications are possible. Upon the processing for estimating resistance Ra and induced voltage constant Ke used to calculate current vector angle correction value Δθ, for example, temporal data about resistance Ra and induced voltage constant Ke is averaged and used for calculating current vector angle correction value Δθ. Also, when estimated resistance Ra and induced voltage constant Ke exceed a predetermined range, using the estimation result is prohibited.

Also, when a phase current for a certain phase is switched from the phase current detection value to the phase current estimation value or from the phase current estimation value to the phase current detection value along with switching of a current detection mode, if a phase current involves a difference (deviation) before and after the switching, a current correction value is set to be gradually closer to the switched, phase current value from the pre-switched, phase current value, whereby three-phase brushless motor 2 can be controlled transiently using such a current correction value.

Moreover, the present invention is applicable to, for example, the configuration that phase current detection values are assigned to two fixed phases and in such a current detection mode that phase currents of the target two phases cannot be directly detected from an output of current sensor 220, phase current estimation values are assigned to all the three phases.

In this case, the following is conceivable. Phase current detection values are assigned to two fixed phases, e.g., U and V phases, and a phase current detection value is assigned to the U phase in the third or sixth current detection mode while phase current estimation values are assigned to the V and W phases. In the second or fifth current detection mode, a phase current detection value is assigned to the V phase while phase current estimation values are assigned to the U and W phases. In the first or fourth current detection mode, phase current estimation values are assigned to all the three phases.

Here, a combination of two fixed phases to which phase current detection values are assigned can be changed every predetermined cycle, or it is possible to switch a mode for fixing two phases to which phase current detection values are assigned and a mode for sequentially and switchingly selecting a phase to which a phase current detection value is assigned according to the current detection mode, depending on the condition such as a motor rotational speed.

REFERENCE SYMBOL LIST

1 Electric sub-oil pump
2 Three-phase brushless motor
3 Motor drive device (MCU)
212 Driving circuit (inverter circuit)
213 Control unit
213a A/D converter
213b Microcomputer
220 Current sensor
220a Shunt resistor
220b Detection circuit

The invention claimed is:
1. A motor drive device comprising:
an inverter configured to supply an AC power to a three-phase brushless motor;
a current sensor configured to detect a DC bus current of the inverter; and
a control unit configured to receive an output of the current sensor and PWM-control the inverter,
the motor drive device executing sinusoidal driving of the three-phase brushless motor,
wherein the control unit calculates a phase current for one phase, an absolute phase current value of which becomes maximum at a detection timing that is set once per PWM control cycle, from an output of the current sensor, sets a phase shift of an actual phase current waveform relative to a motor angle to be variable according to a d-axis voltage, a q-axis voltage, and a motor rotational speed, and then estimates phase currents for the remaining two phases based on a peak value of a phase current detected at each detection timing, a motor angle, and the phase shift.

2. The motor drive device according to claim 1, wherein the control unit sets one phase, an absolute phase current value of which becomes maximum, based on a control duty of each phase.

3. The motor drive device according to claim 1, wherein the control unit calculates the phase shift based on an angle formed by a resistance term and an interference term in a d-q axis voltage model of the three-phase brushless motor or an angle formed by a vector obtained by subtracting an induced voltage term from a motor voltage vector and a q-axis vector.

4. The motor drive device according to claim 1, wherein the control unit corrects the phase shift so as to decrease a current deviation at the time of switching a phase current for one phase between a detection value from the current sensor and an estimation value.

5. The motor drive device according to claim 1, wherein the control unit calculates the phase shift based on a detection value from the current sensor obtained at the time of switching a phase current for one phase between the detection value from the current sensor and an estimation value, and the peak value.

6. A phase current detecting method for a three-phase brushless motor, which is to determine a phase current of each phase in the three-phase brushless motor that is sinusoidal-driven by PWM-controlling an inverter, based on an output of a current sensor for detecting a DC bus current of the inverter, the method comprising the steps of:

setting one detection timing for detecting a phase current for one phase, an absolute phase current value of which becomes maximum, per PWM control cycle;

setting a phase current detection value based on an output of the current sensor at the detection timing;

determining a peak value of the phase current detection value;

detecting a motor angle;

setting a phase shift of an actual phase current waveform relative to the motor angle to be variable according to a d-axis voltage, a q-axis voltage, and a motor rotational speed;

calculating a phase current estimation value based on the peak value, the motor angle, and the phase shift; and assigning the phase current detection value as a phase current value for one phase, and assigning phase current estimation values to the remaining two phases.

7. The phase current detecting method for a three-phase brushless motor according to claim 6, wherein in the step of setting the phase shift, the phase shift is determined based on an angle formed by a resistance term and an interference term in a d-q axis voltage model of the three-phase brushless motor and an angle formed by a vector obtained by subtracting an induced voltage term from a motor voltage vector and a q-axis vector.

* * * * *